Figure 5:
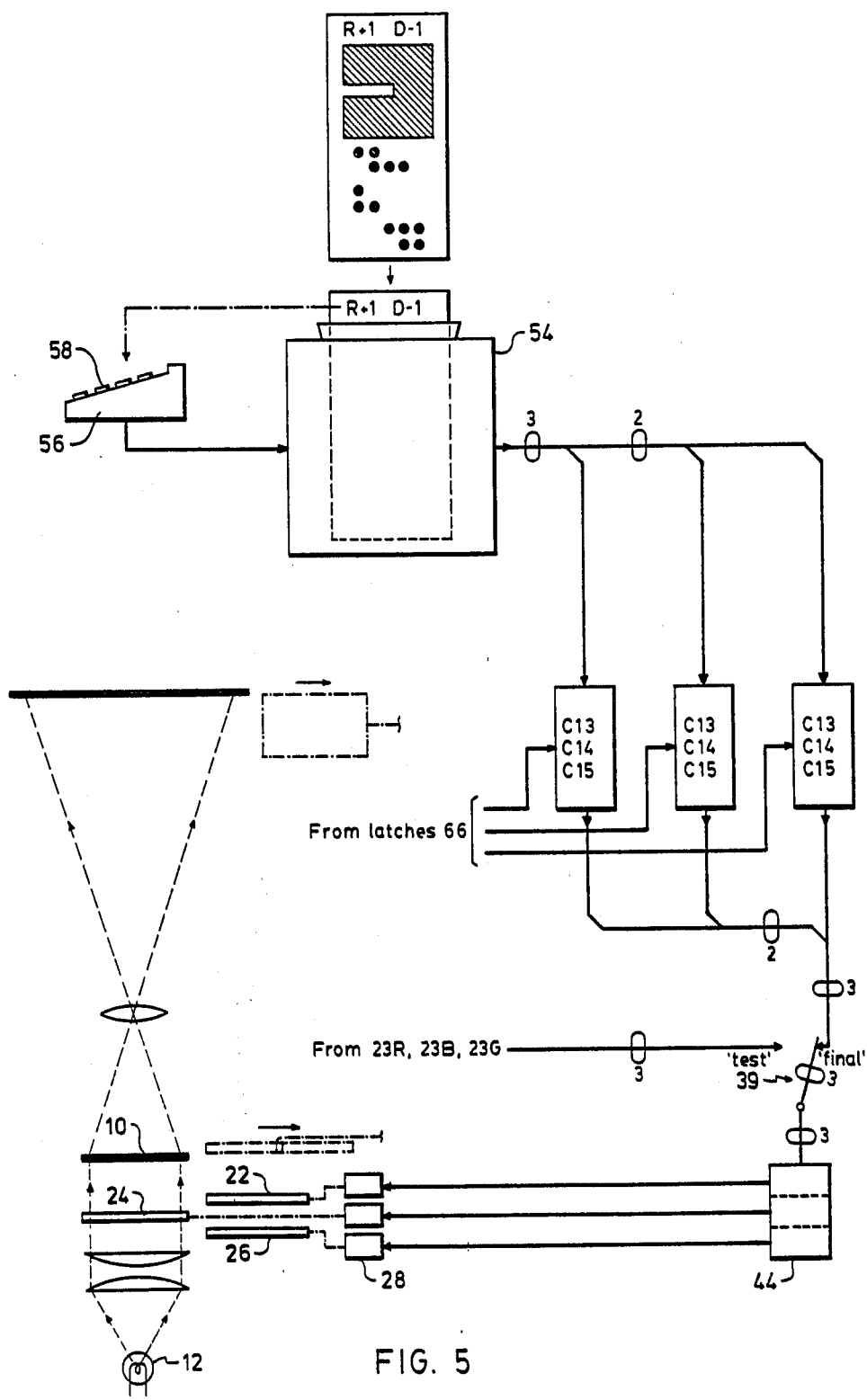

United States Patent [19]

Merlo

[11] 4,353,641

[45] Oct. 12, 1982

[54] COLOR PHOTOGRAPHY PRINT WITH EXPOSURE DATA AND MEANS FOR MAKING

[75] Inventor: Armando M. Merlo, 1561 Keele St., Toronto, Ontario, Canada, M6N 3G1

[73] Assignees: Armando M. Merlo; Angelo Balsamo, both of Toronto, Canada

[21] Appl. No.: 137,305

[22] Filed: Apr. 4, 1980

Related U.S. Application Data

[62] Division of Ser. No. 5,817, Jan. 23, 1979, Pat. No. 4,259,423.

[51] Int. Cl.³ .............................................. G03B 27/80
[52] U.S. Cl. ........................................ 355/38; 355/68; 355/83; 430/11
[58] Field of Search ...................... 355/32, 38, 68, 83; 430/11, 30

[56] References Cited

U.S. PATENT DOCUMENTS

| | | | |
|---|---|---|---|
| 2,566,244 | 8/1951 | Tuttle et al. | 430/30 |
| 2,571,697 | 10/1951 | Evans | 430/30 |
| 3,184,307 | 5/1965 | Letzer | 430/30 |
| 3,586,438 | 6/1971 | Gyori | 355/83 X |
| 3,685,900 | 8/1972 | Kirby et al. | 430/30 |
| 3,716,299 | 2/1973 | Balint | 355/83 |
| 3,947,110 | 3/1976 | Yamada | 355/38 |
| 4,043,667 | 8/1977 | Machida | 355/83 X |

Primary Examiner—Richard A. Wintercorn

[57] ABSTRACT

A color photography printing process prints, a test print on the basis of color intensities of three color ranges transmitted through a small selected area of a test print. The exposure times for the three ranges are recorded besides the print in machine readable code. In the making of the final print the machine readable code controls the printing time. The times determined by the machine readable code may be corrected during the making of the final print by corrections determined by an expert observer of the test print.

20 Claims, 8 Drawing Figures

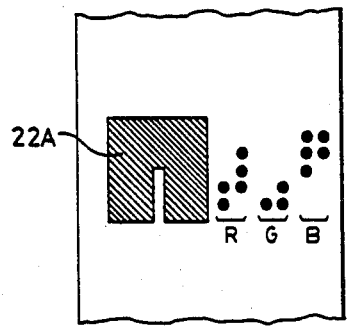
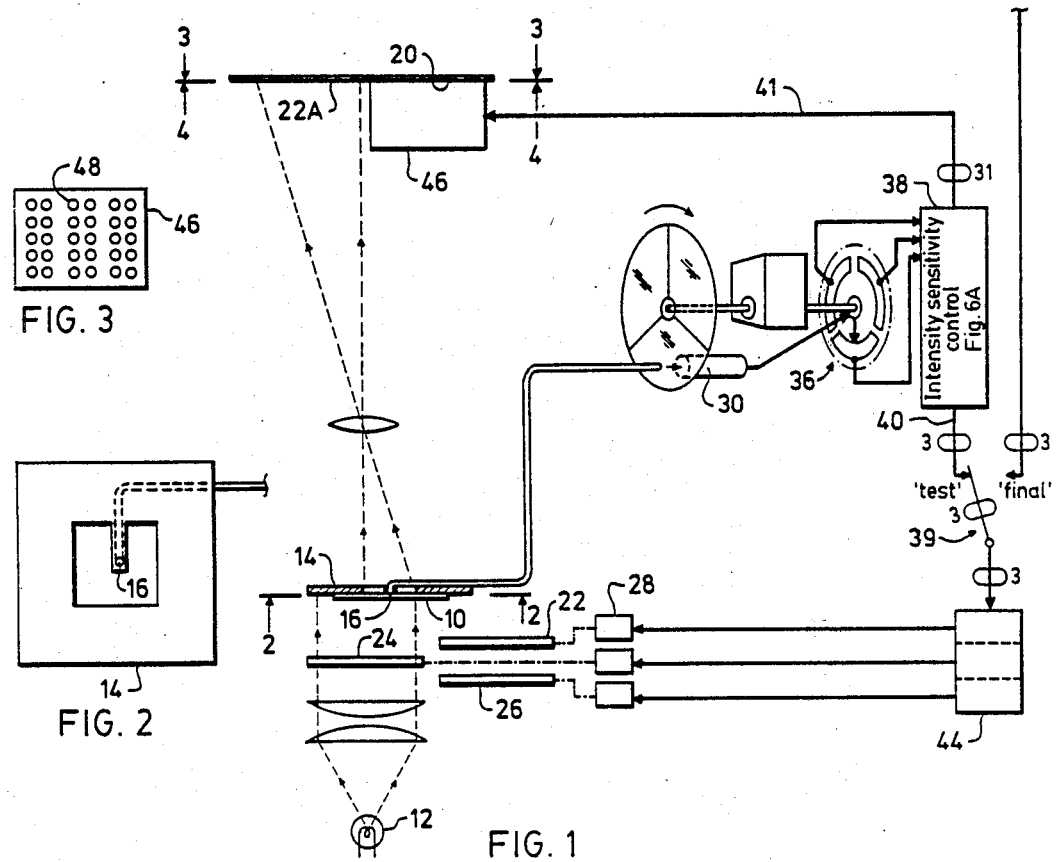
FIG. 4
FIG. 3
FIG. 2
FIG. 1

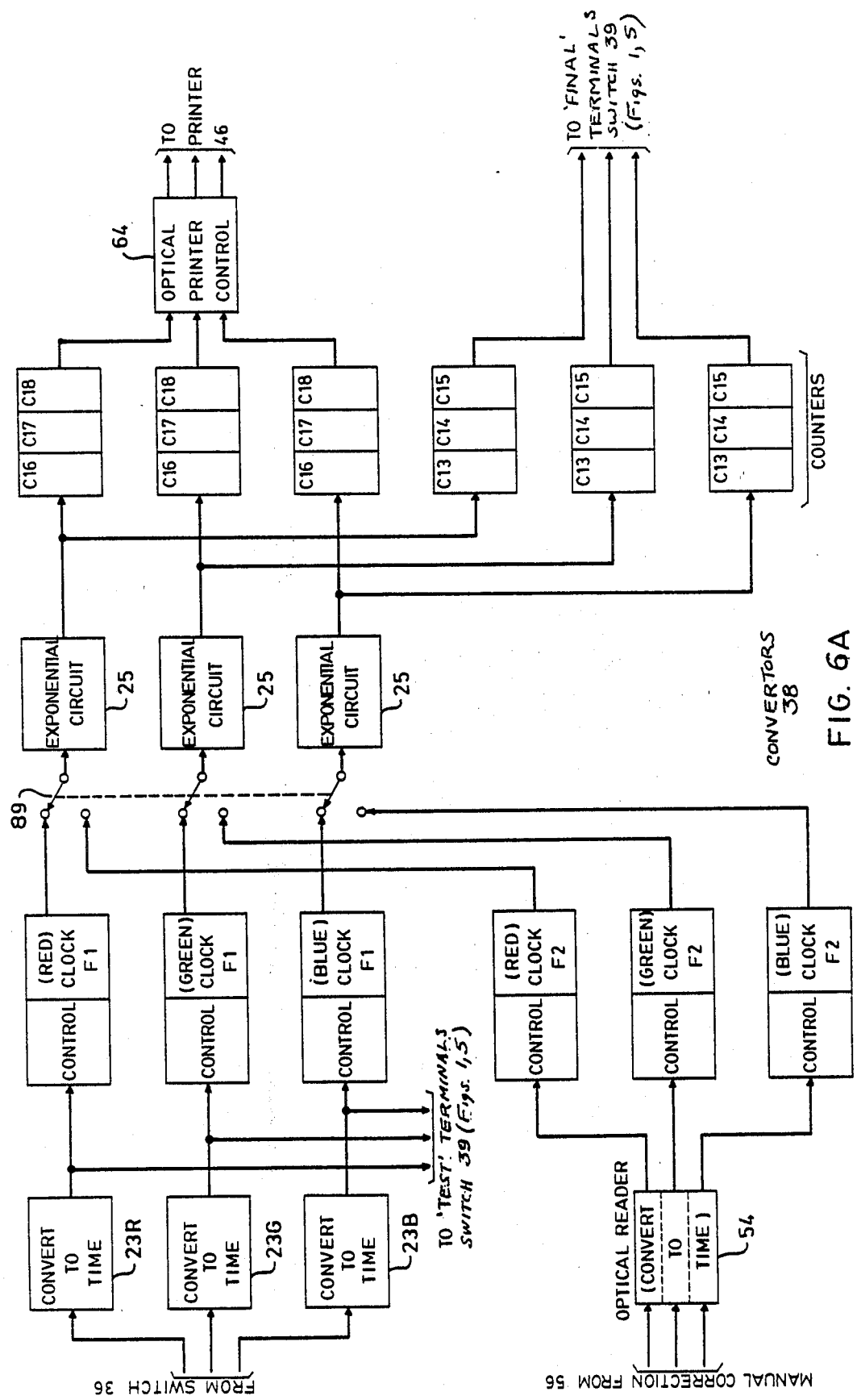

COLOR PHOTOGRAPHY PRINT WITH EXPOSURE DATA AND MEANS FOR MAKING

This is a divisional of application Ser. No. 5,817 filed Jan. 23, 1979 now U.S. Pat. No. 4,259,423, issued Mar. 31, 1981.

This invention relates to a method and means for making color prints.

At the present time a color print is produced by transmitting light through the negative to the print while sensing the intensity of light passing through the negative. The light contains all the hues or color component ranges necessary for the printing process and light sensors (usually photocell) sense the intensity of light in three component ranges (usually red, green and blue) which together can represent the spectrums of the light used and are able, with suitable control of relative intensity, to produce the colors desired in the final print. The sensors provide signals to controls which remove from the transmitted light, the component corresponding to the color range sensed, after a time interval varying inversely with the intensity of radiation within that color range, (not a direct inverse but a relationship well known to those skilled in the art). The removal of such component is accomplished by means of a filter passing light approximately complementary to the color range. Thus the transmission of red, green and blue light is respectively prevented by insertion in the illumination path of cyan, magenta and yellow filters of the proper bandpass characteristics. This present system suffers from numerous disadvantages. The color ranges sensed are those transmitted through the negative as a whole or at least through a substantial path thereof. Although test prints may be made and corrections made to the timing of the exposure times for the various color ranges, the presence of a dominant color, (say a green grass background for an individual) means that the background influences the exposure times more than the skin tones of the person (who, it is assumed is the main subject of the photograph) resulting in incorrect skin tones. Moreover corrections made are of doubtful accuracy since they relate back to the datum of the negative rather than the datums of the test print.

The present invention provides a method and means of providing color prints using the light transmission and complementary filter control as described above. However the printing is performed in two stages: a test print and final print stage. In the test print stage the light transmitted through the negative is not sensed over its whole area but over a small area selected by an expert looking at the negative. Thus if the picture is of a person standing against a green background the area sensed may be the skin tone of the person's face and have none of the components of the background. With such sensing of a narrow, selected, area the three filters, controlling the respective time of application of the three color component ranges are operated in the making of the test print to produce a picture determined by the selected area. (A subsidiary benefit is that the sensor, usually mounted on the end of a laterally extending arm, makes a blank line area on the test print terminating at the area sensed. Thus a supervisor may check from the test print whether the operator has sensed the correct area of the negative). In accord with the general aspects of the invention, the exposure times, of the various component ranges, used during making of the test print are recorded in optically detectable form. Preferably such record is made on printing paper extending from (i.e. integral with) the test print. In the preparation of the final print the light will be again transmitted through the negative but the small area sensor is removed. It is of course essential and it will be understood to be implied throughout that the quality of the illuminating light i.e. the intensity of each component of the illuminating light is substantially the same during the making of the test and the final print. Thus the same controlled radiation source with the same controls will be used during the production of the initial and final print. During the making of the final print a reader receives the optically readable record of the times of illumination by the three component colors recorded during the making of the test print. The information read is converted into timing signals controlling the exposure times for the color components, during the making of the final print, through the operation of the respective filters. Thus the preparation of the final print is independent of the total light transmitted through the negative (during both the making of the test and of the final print) and dependent on the sensing of a small selected area of the negative during the making of the test print. Moreover, the presence of an optical record with a test print allows an expert to look at the test print and note further corrections in the exposure time based on the appearance of the test print. These further corrections may, in accord with the preferred embodiment of the invention, be manually entered on a keyboard by an operator so that the corrections read by the reader may be modified to give corrected operating time for the filters. It will be noted that such corrections use times recorded for the test print as a datum rather than the negative, and thus by progressive correction lead to a better result than with prior art methods.

Figure 6:
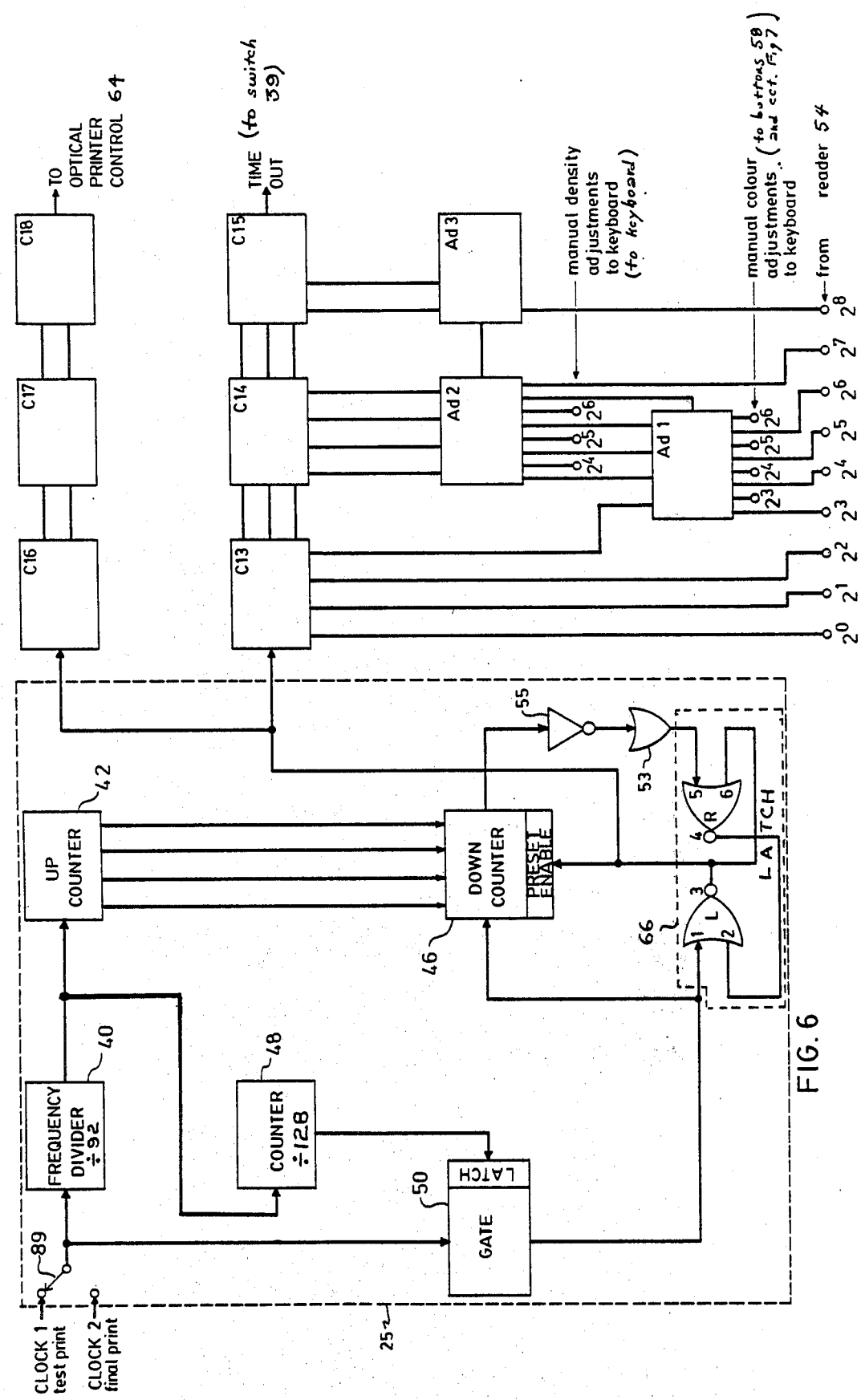
Figure 7:
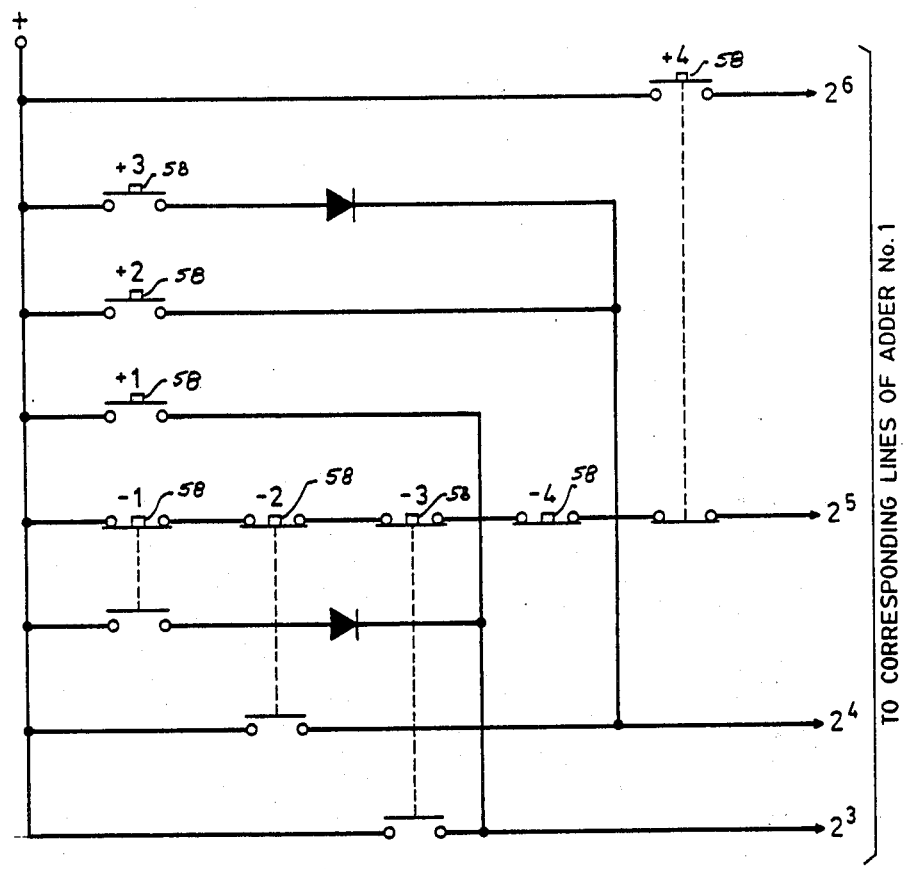

In drawings which illustrate a preferred embodiment of the invention:

FIG. 1 shows, schematically, the operation of the print equipment in accord with the invention during the preparation of a test print, FIG. 2 shows a mask and sensor for use during the making of the test print, FIG. 3 shows, schematically, the means for printing the optically readable record of exposure times, FIG. 4 shows the arrangement of the test print relative to the record of exposure times, FIG. 5 shows schematically, the operation of the printing equipment, during the making of a final print, FIG. 6 shows schematically the arrangement of the electronic circuitry; for producing the timing signals for a color component range; and FIG. 6A shows circuitry for converting the intensity measurements into timing signals, FIG. 7 shows the keyboard arrangement for a manual correction.

In describing the invention the conventional details of the color printing machine and of the color printing process are not described, or shown since these are well known to those skilled in the art. Conventional operation of the machine is therefore, only referred to, to the extent, that it is modified in accord with the invention.

In the FIG. 1 a color negative is suitably located in a holder (not shown) for making a print by light transmitted therethrough. Illumination by incandescent lamp 12 is provided for this purpose. A mask 14 is provided defining a smaller light transmission area than the negative size. A light sensor 16 is associated with the mask projecting transversely from mask material defining the gap area to a free end centered in the gap area and adjacent the negative. The light sensor is preferably composed of optical fibres having their free ends directed toward light source 12 through negative 10. The holder for the negative 10 is arranged so that the negative may be moved lengthwise or laterally relative to the mask 14. The optical path from the illumination means is directed so that the light through the negative and mask, produce print 22A upon one side of the printing paper 20 (see FIG. 4 also) leaving the other side of the printing paper free, in accord with the invention, for receiving a record of color exposure times in accord with the invention. The conventional printing process includes, with the printing process, photocells combined with filters for occluding, respectively, at selected times after the start of the exposure the three color compound ranges or bandwidths containing the spectrum required for the printing process. Although, in theory, any three color ranges of suitable bandwidth and suitably related to one another, may be used, in practice, conventional bandwidths of red, green and blue will be used. To selectively eliminate such colors from the printing process, the occluding filters (i.e. those stopping selectively, approximately, the band pass range of the corresponding filter) will be cyan, magenta and yellow, which are respectively, the complement of red, green and blue. These filters 22, 24, 26 will be located to intercept the illumination path. Controls 28 are provided, actable by an input signal to insert the filter in the path. Thus, in conventional operation, the filters are removed, when the printing process is commenced, by exposure of the negative and printing paper to the light source 12. In conventional operation photocells combined with red, green and blue filters sense the intensity of light transmitted and control exposure times for the red, green and blue light, the time for exposure (for example) to red light varying inversely (since the transmission is through the negative) as the intensity of red light through the negative. Such inverse relationship is not direct in view both of the (primarily logarithmic) relationship of exposure time to printed intensity and in view of varying responses of the printing paper to varying colors. However the relationship is well known to those skilled in the art.

In accord with the invention, the same filters 22, 24 and 26 and controls are used. However the light intensities in the test print are not sensed over the entire surface but are sensed at the sensor 16 only. The sensor 16 is provided with optical fibre ends which conduct the light to a filter and switching system which combines with a photomultiplier 30. A filter disc 32 is located between the fibre end 34 and the photomultiplier 30. A rotary switch 36 synchronously distributes the photomultiplier 30 output (which may be considered as a voltage varying as the intensity of the light impinging thereon) to the filter controls corresponding to the red, green and blue color ranges. (The reason that a photomultiplier is preferred instead of a photocell for use with the invention is the smaller amount of light available for detection with the inventive method). In accord with the apparatus shown, therefore, the rotation of the filter disc causes the successive presentation of red, green and blue light to the photomultiplier 30 while the rotary switch 36 synchronously distributes the photomultiplier voltage output to the corresponding controls 38 for red, green and blue exposure times. The controls are designed (as previously described) to provide, corresponding to each color range, a timing signal after a period measured from the commencement of illumination of the negative. The period will vary in an inverse manner with the intensity of the corresponding color range. For a given color range, the period commencing with illumination and ending with the timing signal represents the exposure period for that color range.

The signal is, (as with the signal with conventional operation) used to operate the corresponding complementary filter 22, 24 or 26 i.e. the respective intensities measured by the red, green and blue light impinging upon the photomultiplier results in respective control signals imposing the cyan, magenta and yellow filters 22, 24 and 26 respectively upon the illumination path. In accord with the convention operation of the machine, the imposition of the third and last filter completes the printing process and the illumination is turned off.

In accord with the invention, therefore, the test print is prepared with the printing paper in position. The mask with pointer is located to direct the light passing therethrough to an area to one side of the printing paper as best illustrated in FIG. 4. The negative is then positioned so that the desired area thereof (e.g. the face of a human subject) is beneath the sensor 16 to be sensed by the photomultiplier and control the filters.

The controls 38 determine the respective timing signal for each color. Such timing signals are sent along (3) lines 40 to the "test" terminal of the connection schematically represented by switch 39. During the making of the test print the connection of switch 39 is as shown in FIG. 1 and the three lines from blocks 38 to 44 represent the control signals for individually operating the complementary filters 22, 24 and 26 at the appropriate times to terminate the exposures to red, green and blue light. FIG. 1 shows, for example, the magenta filter 24 operated to prevent further exposure to green light, and the cyan and yellow filters 22 and 26 not yet operated. When the print, in accord with such printing, is produced, the outline or silhouette of the pointer appears on the blank (as schematically illustrated on 22 of FIG. 4) and the print is colored in accord with the small area of negative sensed. At the same time as the print was made the times for actuation of the three filters 22, 24 and 26, (i.e. the times of exposure of to red, green and blue light) were recorded at each control 38. The record is used to actuate device 46 to print, on the printing paper, adjacent the print, a visually readable record of the times. The device 46 as shown in FIG. 3 comprises an array of lights, being three sub-arrays, "R", "G", and "B" corresponding to each of the colors, red, green, blue, and with each light arranged to shine through a corresponding circular aperture in the mask 48. Thirty-one lines are indicated between a converter 38 and device 46, i.e. 30 energizing lines and a ground line. It will be obvious that other numbers of lines can be used to make 30 independently actuable binary indicators.

The exposure of the paper beside the test print to produce the binary timing record is performed automatically by the operation of suitable machine controls immediately after the production of the print from the negative. The edges of body 46 are located close enough to the printing paper that the printing of the binary record does not damage the adjacent print 22 from the negative.

The print and its binary exposure record normally form part of a strip of similar pairs on the paper transport and are cut to provide the data for preparation of the final print.

Inspection of the test print by an expert will produce two things, (a) the silhouette of the pointer indicates at its free end the portion of the print which was sensed, so that the expert can tell if this was correctly positioned by the machine operator and (b) the expert may make his personal appraisal of the quality of the print. The expert, to the extent that he decides that more or less red, green or blue is required may write a manual correction for one or more of these colors. Such correction by analogy to conventional methods will, for each color be written as + or − units from 1 to 4 or "N" (no correction). However, it should be emphasized that such corrections in the inventive system are to recorded data whereas in prior system such corrections are to the actual sensing times during production of the print.

For the corresponding final printing operation the operator is provided with the negative on the one hand and the test print with recorded and manual correction. The mask 14 and sensor 16 are removed. The test print, as distinct from the corrections, functions only to identify the records to the operator and assure that the records and negative correspond.

A reader 54 is provided to read the binary code and convert it into printing times. A manual correction key board 56 is provided having buttons 58. For each color, the reader 54 together with the manual correction, is designed to provide a time signal which controls the operation of the filters 22,24 or 26. The filter controls are therefore under the control of timed signals from reader 54 rather than from controls 38 and, in any event, the sensor 16, which supplied the input signals to the sensors is not on use. Thus the switch 39 will have been moved to the right hand position connecting reader 54 instead of control 38 to the filter control 44. Reader 54 will, of course, convert the digital information read into three timing signals which are sent separately at the indicated times along the three lines to filter control 44.

It will be noted that, contrary to prior art practice, the color quality of the final print, is independent of the total light going through the negative, but depends on the times recorded for the selected small area of the test print during its production together with the manual correction. The manual correction may be written beside the print as indicated in FIG. 5. It will be noted that the method of the invention, by recording in visually readable form, the printing times, allows the superposition of a manual correction thereon to further improve the quality of the final print.

It will be noted that it is within the scope of the invention to provide the optically readable record of the exposure times independently (i.e. on an independent paper or card) from the test print. However it is much more convenient to combine the visual record with the print as shown in the preferred form of the invention.

The circuit of FIG. 6 shows a circuit for recording times during the making of the test print and includes means shown for controlling the timing during the printing of the final print. The circuit functions as the source for timing pulses for the optical recording control during the making of the test print and as the source of timing pulses for converting the corrected digital times of reader 54 into filter control signals. The circuit shown is for a single color component range, say red. Thus similar circuits are provided for the green and blue color component ranges. The object of the circuit is to produce a circuit where the time $T = K^c$ where T is the exposure time represented by a number of pulses C and K is a constant. The reason such circuit is used is that a count C logarithmically (or exponentially) related to the time T allows digital corrections to the count to effect a percentage change. Assume that a positive correction of +20% in the exposure time is made by increasing the recorded count by 16. It is readily seen that the $$\frac{Tc \text{ (corrected time)}}{Tr \text{ (recorded time)}} = \frac{K^{C+16}}{K^c} = K^{16}$$

or a fixed ratio which is this case is assumed to be 1.2 or a 20% increase.

For simplicity of illustration the circuit omits reset connections for resetting the circuit at the end of an operation.

In FIG. 6 the use of a clock input of frequency F1 from clock 1 is used during the making of the test print. Clock 2 of a faster rate, F2 is used during the making of the final print for a reason to be specified hereafter.

The clock 1 is, during the making of the test print, connected by switch 89 through a frequency divider 40 (divide by 92) to up counter 42, and the output of frequency divider 40 is also connected to a counter 48 which also acts as a frequency divider (divide by 128). The clock 1 is also connected to the output of gate 50. The output of counter 48 is connected to provide, after 128 pulses at its input, a signal to the latch of gate 50 to allow the passage through gate 50 of the clock 1 signal. When counter 48 reaches a count of 128 it is designed to send a signal to latch open gate 50 allowing the clock 1 pulses to reach downcounter 46. The downcounter 46 is designed, when a signal is received at its preset enable gate, to preset on the stages of downcounter 46 the count then in upcounter 42. Latch 66 is a cross connected set of NOR gates L and R as shown.

When the exposure is commenced, during the making of the test print, counters 42 and 48 operate until counter 48 operates the latch of gate 50 to allow through the gate 50 the pulses from clock 1. When the first pulse through gate 50 arrives at the gate 1 of the NOR gate L the output switches to 0 'setting' the downcounter at the then value in up counter 42. The latch output remains at 0 until the downcounter reaches 0 and this 0 output produces a 1 at the input 5 of the NOR gate R altering its output to 0 and with no pulse on the input 1 of the NOR gate L the latch is again flipped and again puts the input of the upcounter 42 now higher by the amount which accumulated in counter 42 during the down count into the downcounter. At the same time the pulse from latch 66 is registered in counter C16. (This is the second pulse at the end of the first interval as described in the numerical example to follow. The arrival of the next pulse from gate 50 again sets the latch to 0 output so that the downcounter 46 is "set" and will again count down the value since the upcounter is continually rising it will be seen that the spacing of the output pulses between countdowns in downcounter 46 varies exponentially with the number of output pulses and that the total time of the exposure $T = K^c$ where K is a constant and C is the number of output pulses from latch 66. The count of the output pulses is registered in counters C16, C17, C18. Counters C16, C17, C18 act as a single counter but are shown in expanded form to correspond to counters C13, C14, and C15 to be described hereafter. (The supply of pulses to downcounters C13, C14, C15 is of no significance during the making of the test print as these downcounters perform no functions at this time). When the exposure time for the color corresponding to the circuitry shown (here red) is completed by the imposition of a corresponding cyan filter 22 (FIG. 1) the signals F1 are stopped and a signal is supplied to counters C16, C17, C18 and the count therein is supplied to optical printer control 54 and converted to control signals to print the binary count for the color (here red) on the paper adjoining the test print. Such circuit is provided for each color. The three binary records will be printed together, as indicated in FIG. 4.

The circuitry of FIG. 6 will now be described for operation during the making of the final print. The binary record part of the card (see FIG. 5) is inserted in reader 54. A keyboard is provided for the color correction here red. It is desirable that the color correction should be made in conventional indicia known to a color photography expert. There are from $-4, -3, -2, -1, N+1+2+3+4$. Each upward step represents an increase of 9.05% of intensity of the step below so that $+1$ is 109.05%, $+2$ 118.8% and so on, $-1$ is 90.95% $-2$ is 83.5% and so on. In order that subtractive corrections may be made, it is necessary to add a value more than the correction and in the color adjustment this is $2^5$ (32).

The truth table for the input corrections at the color 'Ad 1' is shown below:

| | Truth Table - Adder 1 | | | |
|---|---|---|---|---|
| | (Color Correction) Add to input | | | |
| Button No | $2^3$ | $2^4$ | $2^5$ | $2^6$ |
| $-4$ | 0 | 0 | 0 | 0 |
| $-3$ | 1 | 0 | 0 | 0 |
| $-2$ | 0 | 1 | 0 | 0 |
| $-1$ | 1 | 1 | 0 | 0 |
| N | 0 | 0 | 1 | 0 |
| 1 | 1 | 0 | 1 | 0 |
| 2 | 0 | 1 | 1 | 0 |
| 3 | 1 | 1 | 1 | 0 |
| 4 | 0 | 0 | 0 | 1 |

The wiring for the manual correction for color adjustment is shown in FIG. 7. Such correction is made on keyboard with a circuit corresponding to FIG. 7 corresponding to each color.

A similar circuit to that of FIG. 7 is provided for the manual density correction also expressed in units well known to those skilled in the art. However, since the manual density correction is common to all colors, the manual density correction circuit supplies the same correction to the green and blue circuits similar to FIG. 6. The keyboard connections for the manual density correction are similar to those for the color adjustment but the arbitrary amount added to allow subtraction is $2^6$ rather than $2^5$ since the manual density corrections are twice the manual color corrections.

The manual corrections therefore involve the arbitrary addition of $2^5$ or 32 at the manual color adjustment and $2^6$ or 64 at the manual density adjustment. That is $32+64$ or 96 "counts" are added, even if there is no correction to the amount received from optical reader. To avoid an increase in time it is necessary to compensate for the added 96 "counts". This may be achieved by an increase in the frequency F2 over F1 used during the timing of the final print exposure interval. The fact that addition of a constant number of counts may be compensated for by an increase of frequency follows from the following.

During the making of the test print or one of the color components the relationship $aT = K^c$ hold where K and a are constants, T is the exposure time for the component and c is the number of counts from the logarithmic counter. This may, during the making of the test print be expressed as $F1AT = K^c$ where F1 is the first clock frequency; and A is a constant and the same formula may be expressed as $F2AT = K^{c+96}$ where F2 is the second clock frequency.

Dividing the last two formulae we obtain the ratio $$\frac{F1}{F2} = \frac{K^c}{K^{c+96}} = \frac{1}{K^{96}}.$$

Since $1/K^{96}$ is a constant, it follows that the increase in F2 will compensate for the correction. In operation of course the formula $F2AT = K^{c+96}$ becomes $F2KT = a^{c+96+X}$ where X is positive or negative and is the sum of the manual density + color corrections.

The overall operation of the device may be described in relation to FIG. 6A which may be read in combination with FIGS. 1 and 5.

As indicated in FIG. 6A during the making of the test print the outputs of photomultiplier 30 are directed by switch 36 to convertors 23R, 23G and 23B to convert the photomultiplier output for the red, green and blue into timing signals defining an exposure time of duration inversely varying with the intensity sensed. Switch 89 (FIG. 6) connects each block 25 to the output of a clock 1. Clock 1 signals initiated with the start of exposure and continuing during the making of the test print are used to control the operation of the complementary filters to terminate the exposure of the test print to each color component range at the times determined by convertors 23. This is conventional operation as well known prior to this invention by those skilled in the art. The only modification in the process this far, over prior art procedures, is the use of a mask and the sensing of transmission through a small area of the negative (preferably using a photomultiplier) as opposed to sensing transmission through a wider negative area (usually using a photocell) under the prior art.

The timed output of convertors 23 terminates the duration of operation of clocks F1 whose operation was initiated at the start of the making of the test print. In making the test print, also, the switch 39 at filter control 44 was operated to connect the filter control to the output of the intensity to time convertors 23.

The clocks F1 respectively are connected to corresponding exponential circuits 25 by switches 39 during the making of the test prints. The exponential circuits 25 are shown in more detail in FIG. 6 provide a "count" c to counters C16, C17, C18 in accord with the relationship $AF1T = K^c$. This count c is, for each exposure time, printed on the printing paper beside the test print, in binary code as shown in FIG. 4.

Between the making of the test and the final print the manual color and density corrections are indicated in longhand on a blank area adjacent the print. (See "R+1" (red+1) D−1 (density−1) FIG. 5). Before making the final print the manual corrections are inserted through the keyboard buttons 58. The negative and printing paper are then positioned for the making of the final print. Switches 89 (FIG. 6 and FIG. 6A) are operated to connect block 25 to clock 2. The switch 39 of filter control 44 (FIGS. 1 and 5) is switched to connect the filter control to the output of downcounter C15. The optical "count" record is then inserted in the reader 54 (see FIG. 5). The circuitry at the right hand of FIG. 6 inserts the results from reader 54 as manually corrected at adders Ad1, Ad2 and Ad3 into downcounters C13, C14, C15. The exposure of the final print is then commenced. Clock 2 is then turned on and the signals appear at exponentially related intervals from counters 25. The signals from counters 25 to counters C16–C18 are ignored during the making of the final print, however the signals from counters 25 to counters C13–C15 "count down" the respective counters at the logarithmically increasing periods. As each counter set through elements 55, 53 caused latch 66, (in addition to sending the pulse to counter C13 and C16) to again cause the transfer of the count (now 129) from counter 42 to downcounter 46. The time to 'count down' counter 46 to 0 resulting in the next pulse to counters C13, C16 is $129 \times 20$ sec $= 0.00258$. Thus pulse 3 occurs at an accumulated time lapse of 0.24066 sec. It will be noted that during a countdown period the count in upcounter 42 will increase by 1 or 2. Although this supplies slightly irregular time increments, this slight irregularity is insignificant over the entire exposure time.

The table below shows the status of the logarithmic circuitry for the first 17 pulses.

| Pulse No (from 66) | Total Elapsed time from start C1 (Sec) | Increment for Countdown Counter 46 (Sec) | Count in Counters 42–46 | Add to Counter 42 | Residue in Divider 40 | |
|---|---|---|---|---|---|---|
| 1 | .23552 | .00256 | 128 | 1 | 128−92 | 36 |
| 2 | .23808 | .00258 | 129 | 1 | 129+36−92 | 73 |
| 3 | .24066 | .00260 | 130 | 2 | 130+73−92−92 | 19 |
| 4 | .24326 | .00264 | 132 | 1 | 132+19−92 | 59 |
| 5 | .2459 | .00266 | 133 | 2 | 133+59−92−92 | 8 |
| 6 | .24856 | .00270 | 135 | 1 | 135+8−92 | 51 |
| 7 | .25126 | .00272 | 136 | 2 | 136+51−92−92 | 3 |
| 8 | .25398 | .00276 | 138 | 1 | 138+3−92 | 49 |
| 9 | .25674 | .00278 | 139 | 2 | 139+49−92−92 | 4 |
| 10 | .25952 | .00282 | 141 | 1 | 141+4−92 | 53 |
| 11 | .26234 | .00284 | 142 | 2 | 142+53−92−92 | 11 |
| 12 | .26518 | .00288 | 144 | 1 | 144+11−92 | 63 |
| 13 | .26806 | .00290 | 145 | 2 | 145+63−92−92 | 24 |
| 14 | .27096 | .00294 | 147 | 1 | 147+24 | 79 |
| 15 | .27390 | .00296 | 148 | 2 | 148+79−92−92 | 43 |
| 16 | .27686 | .00300 | 150 | 2 | 150+43−92−92 | 9 |
| 17 | .27986 | .00304 | 152 | 1 | 152+9−92 | 69 |

C13–C15 for a color component range reaches 0 it is designed to provide an output signal to control 44 to operate the corresponding filter complementary to the range. The time for the count down of a counter C13–C15 will, as previously explained, with proper selection of F2:F1, be the exposure time recorded for the same color during the making of the test print, plus the manual correction.

An example of frequencies for use with the circuitry of FIG. 6 is given. This is not intended to be limiting and it will be obvious that the circuitry will be operable with other frequency and counter values and with other circuit elements for achieving the same result. In the circuitry of FIG. 6 clock 1 has a frequency of 50 KH. The clock 1 signals thus have a period of 20 μseconds. Frequency divider 40 effects a division by 92 in the frequency of pulses and counter 48, which also acts as a frequency divider effects a division by 128 in the frequency at its input. Thus the time, after the start of clock 1, to operate the latch of gate 50 to allow pulses therethrough is time the first pulse will be sent from latch 66 to counters C16 and C13, e.g.: 20 μsec$\times 92 \times 128$ or 0.23552 seconds. At the elapsed time the downcounter 46 receives the count in up counter 42 which will be 128. The time for counter 46 to count down from 128 will be 0.00256 seconds after which the second pulse will be sent to counters C13 and C16. During the 'countdown' time between the first and the second pulses, counter 42 will have added one count and stand at 129 with 128−92 or a residual 'count' of 36 in counter 40 toward the next pulse to counter 42. When the downcounter 46 reached 0 the resultant pulse It will be noted that over the first 16 intervals (pulse 1 to pulse 17) the pulse interval has increased $48/256 \times 100 = 18.7\%$. It will be found that the 64th pulse interval is twice that of the first and the 96th $2\sqrt{2}$ or about 2.83 times. The criterion is that the total elapsed times should be equal when 96 is added to the count between the test and the final print, is as has been indicated:

$$\frac{F1}{F2} = \frac{1}{K^{96}} K^{96} = 2.82.$$

Thus in the example, 96 is added to the count in counters C16, C17, C18 recorded during the making of the test print. The final print using the '96 augmented' count will therefore achieve correct exposure intervals with a clock 2 frequency F2 of $2.82 \times 50$ KHz or 141 KHz.

I claim:

1. Means for preparing color photographic prints using equipment wherein the negative is used to produce a print while illuminated with radiation containing three ranges of color components sufficient to provide the colors required for the printing process and wherein the illumination time of the negative, by light from said radiation within each color component range, is terminated by insertion in the illumination path of a filter having an approximately complementary range to the range of the colour component range to be terminated, and wherein means are provided for controlling the time of insertion and the insertion of said filters;

means operable during production of a test print comprising:

means, corresponding to each of said color ranges, and operable during the illumination of said negative, for sensing the intensity of light, within the corresponding color range, transmitted through a small selected area, of said negative, means responsive to each of such intensities for controlling in accord with the intensity so sensed, the insertion of the filter having the complementary color range to the intensity so sensed, to provide an exposure time to the color range having an inverse relationship to the sensed intensity, means corresponding to each of said color ranges for recording, in machine readable form, the illumination time for that color range up to such termination.

2. Means as claimed in claim 1 wherein said means for defining said small selected area, and means for sensing the light transmitted through such small selected area comprises:

A sensor having a sensing tip located at the free end of a longitudinally extending member projecting transversely into the illumination path between said negative and said print and adjacent said negative, said sensing tip being small relative to the cross-sectional area of light passing through said negative, whereby the test print includes an outline of said longitudinally extending member and said sensing tip.

3. Means are claimed in claim 1 wherein recording means comprises means for producing such record in machine optically readable form.

4. Means as claimed in claim 2 wherein recording means comprises means for producing such record in machine optically readable form.

5. Means as claimed in claim 2 wherein said record is in optically readable binary form.

6. Means as claimed in claim 3 wherein said record is in optically readable binary form.

7. Means as claimed in claim 1 wherein said recording means comprises means for recording said illumination time in machine readable form on the paper carrying said test print.

8. Means as claimed in claim 2 wherein said recording means comprises means for recording said illumination time in machine readable form on the paper carrying said test print.

9. Means as claimed in claim 1 wherein said recording means comprises means to selectively expose area of the paper carrying said test print to produce said illumination time on such test print paper in machine readable binary code.

10. Means as claimed in claim 2 wherein said recording means comprises means to selectively expose areas of the paper carrying said test print to produce said illumination time on such test print paper in machine readable binary code.

11. Means as claimed in claim 1 in combination with means operable during the making of final print therewith when said sensing means is removed from the optical path comprising:

means for reading said machine readable records of illumination time, means operable during the illumination to provide said final print for controlling illumination time by light within each color range by operation of the corresponding filters determined in accord with said readings of said machine readable records.

12. Means as claimed in claim 3 in combination with means operable during the making of final print therewith when said sensing means is removed from the optical path comprising:

means for reading said machine readable records of illumination time, means operable during the illumination to provide said final print for controlling illumination time by light within each color range by operation of the corresponding filters determined in accord with said readings of said machine readable records.

13. Means as claimed in claim 5 in combination with means operable during the making of final print therewith when said sensing means is removed from the optical path comprising:

means for reading said machine readable records of illumination time, means operable during the illumination to provide said final print for controlling illumination time by light within each color range by operation of the corresponding filters determined in accord with said readings of said machine readable records.

14. Means as claimed in claim 7 in combination with means operable during the making of final print therewith when said sensing means is removed from the optical path comprising:

means for reading said machine readable records of illumination time, means operable during the illumination to provide said final print for controlling illumination time by light within each color range by operation of the corresponding filters determined in accord with said readings of said machine readable records.

15. Means as claimed in claim 8 in combination with means operable during the making of final print therewith when said sensing means is removed from the optical path comprising:

means for reading said machine readable records of illumination time, means operable during the illumination to provide said final print for controlling illumination time by light within each color range by operation of the corresponding filters determined in accord with said readings of said machine readable records.

16. Means as claimed in claim 1 including means effective during the making of said final print for modifying the time of operation of each of said filters as otherwise determined by said machine readable records.

17. Means as claimed in claim 3 including means effective during the making of said final print for modifying the time of operation of each of said filters as otherwise determined by said machine readable records.

18. Means as claimed in claim 5 including means effective during the making of said final print for modifying the time of operation of each of said filters as otherwise determined by said machine readable records.

19. Means as claimed in claim 7 including means effective during the making of said final print for modifying the time of operation of each of said filters as otherwise determined by said machine readable records.

20. Means as claimed in claim 9 including means effective during the making of said final print for modifying the time of operation of each of said filters as otherwise determined by said machine readable records.

* * * * *